Figure 1:
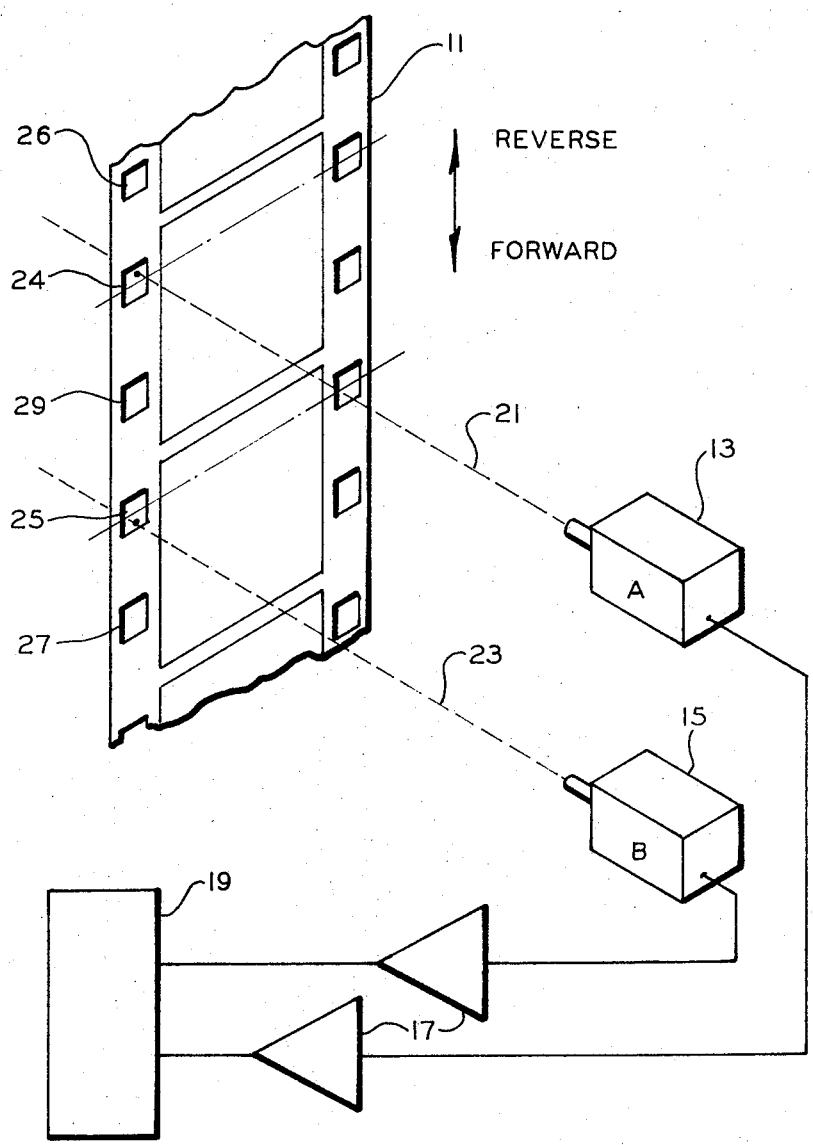

United States Patent [19]

Maggi

[11] 3,793,508
[45] Feb. 19, 1974

[54] FILM FRAME COUNTER
[75] Inventor: Charles Robert Maggi, Endicott, N.Y.
[73] Assignee: The Singer Company, Binghampton, N.Y.
[22] Filed: Dec. 21, 1971
[21] Appl. No.: 210,444

[52] U.S. Cl. ........ 235/92 V, 235/92 EV, 235/92 PS, 235/92 R, 250/219 FR
[51] Int. Cl. .......................................... H03k 21/06
[58] Field of Search 235/92 V, 92 PS, 92 SB, 92 EV, 235/61.11 E; 73/157; 340/259, 260; 250/219 FR, 219 R; 226/134, 135, 136; 356/199

[56] References Cited
UNITED STATES PATENTS
3,299,272   1/1967   Yozo Furukawa et al. ...... 235/92 V
3,542,286   11/1970  Binkley et al. ............... 235/61.11 E
2,893,633   7/1959   Van Haagen ................... 235/92 PK
3,696,981   10/1972  Levy ..................................... 226/11

Primary Examiner—Paul J. Henon
Assistant Examiner—Joseph M. Thesz, Jr.
Attorney, Agent, or Firm—John C. Altmiller; James C. Kesterson

[57] ABSTRACT

A film frame counter in which a first optical scanner is arranged to intersect the top half of one sprocket hole when a second scanner intersects the bottom half of another sprocket hole providing signals at a first level when intersecting a sprocket hole and at a second level when not. Because of this arrangement, a unique series of logic transitions occurs in each direction which is detected and the frame count updated only when all transitions have occurred in proper sequence avoiding false counts due to jitter or hunting.

8 Claims, 2 Drawing Figures

FILM FRAME COUNTER

This invention relates to visual simulation in general and more particularly to an improved film frame counter.

Visual systems are used as attachments to flight trainers, driver trainers, locomotive simultaors, ship simulators, etc., to provide the trainee with a more realistic training environment. In many cases the visual scene is reproduced from information stored on movie film. Such a film will be normally taken from a vehicle performing the same maneuvers in which training is desired. The film is then played back in the trainer possibly with some optical transformation to compensate for changed perspective due to deviations of the simulated vehicle from the taking path.

In some such systems information relating to the taking position is coded on the edge of the film so that deviations from the taking path may be computed. An alternative to this is to store such data relating to the position at which various frames of the motion picture were taken in a computer memory device such as a tape, disk, drum, core, etc. Each group of data will then have associated with it a corresponding frame number and it is then necessary to know at all times which frame is being projected.

Various types of film frame counters have been developed most of which are subject to occasional errors due to jitter of the film or other causes. The present invention seeks to overcome these problems by providing an infallible film frame counter. Although basically intended for use in trainer visual systems it will be recognized that the system may be used wherever an accurate film frame count is needed.

It is the principle object of this invention to provide an infallible film frame counter.

Another object is to provide such a counter which is bidirectional. A further object is to provide such a counter useful in simulator and trainer visual systems.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

Figure 2:
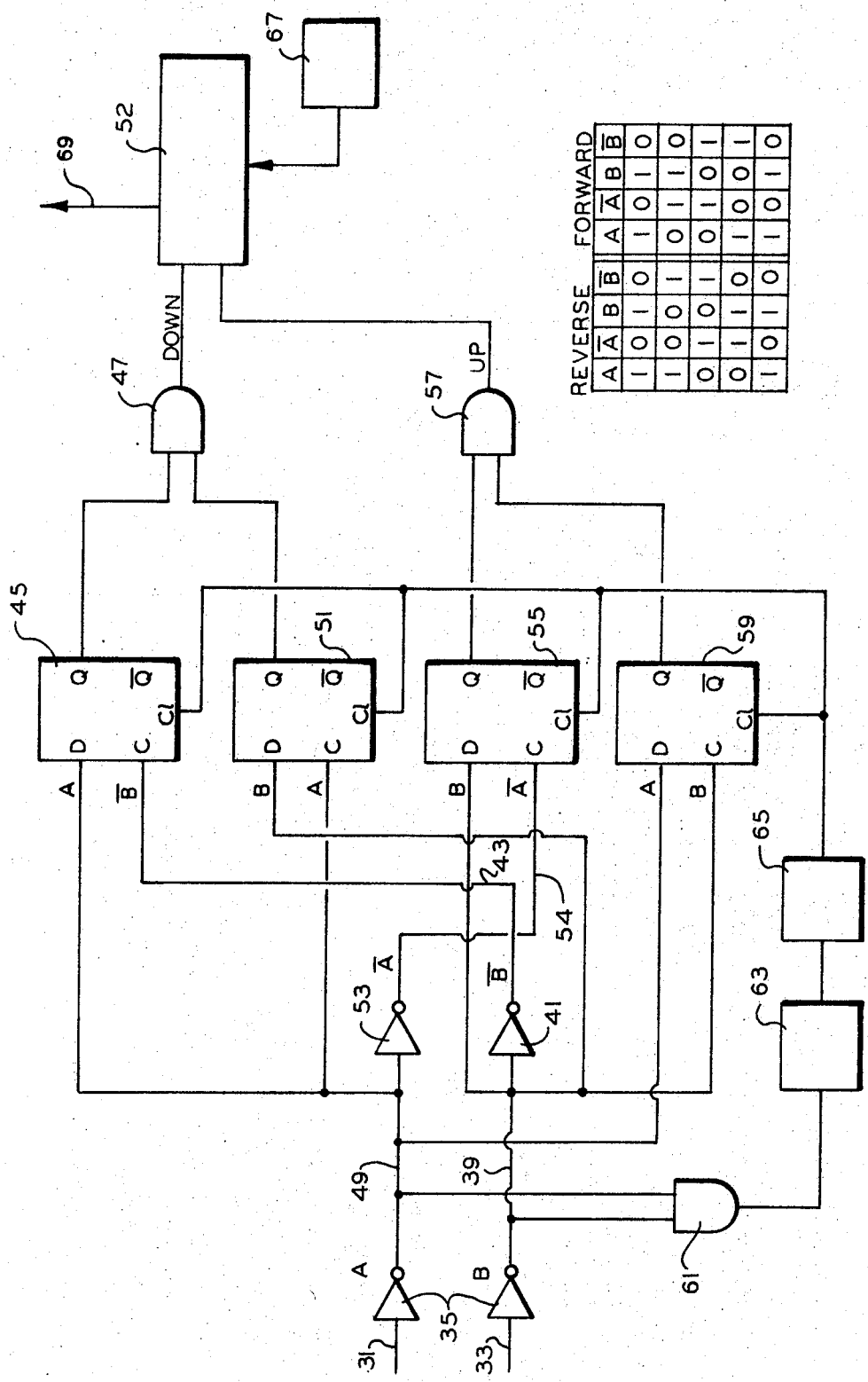

For a fuller understanding of the nature and objects of the invention reference should be had to the following detailed description taken in connection with the accompanying drawing, in which:

FIG. 1 is partially a perspective and partially a block diagram of the preferred embodiment of the present invention; and FIG. 2 is a logic diagram of the logic system used in FIG. 1.

In FIG. 1 is shown a section of the film 11, two sensors 13 and 15, sensor amplifiers 17 and a logic and counter block 19. Sensors 13 and 15 may be a Mini-Skanner Micro-Character Detector model S-3010-3 or equivalent and the amplifiers 17 for use therewith Sensing Amplifier Model Number T-310D both manufactured by Skan-A-Matic Corp. of Skaneateles, New York. These sensors transmit a narrow beam of light the reflections of which are picked up by a narrow light receiving fiber in the center of a bundle of light transmitting fibers having a field of view of 0.010 inch. Sensors 13 and 15 are arranged so that the axis 21 of sensors 13 will intersect near the top of a sprocket hole 24 of one film frame when the axis 23 of sensor 15 is intersecting near the bottom of a corresponding sprocket hole 25 of an adjoining frame. (Each frame of film in the disclosed embodiment has two sprocket holes associated with it.) When axes 21 and 23 intersect the sprocket hole areas no reflections occur resulting in a zero output from the sensors and amplifiers 17. (The area behind the film may be painted a dull black to absorb light.) When an axis intersects film a reflection and corresponding signal from the sensor 13 or 15 and its associated amplifier 17 will occur.

Assuming that the film is in the position shown and is moving or begins to move in the reverse direction, axis 23 will soon intersect film 11 and sensor 15 will produce an output signal pulse. At this point the axis of sensor 13 will still intersect sprocket hole 24 and, consequently, the sensor output will be zero. If the film is moving or begins to move forwardly, axis 21 will intersect film 11 and sensor 13 will produce an output signal. If film motion continues in the forward direction, axis 23 will intersect hole 27 and the output of sensor 15 will go to zero. Shortly thereafter beam axis 21 will intersect hole 29 whereupon the output of sensor 13 will drop to zero. The film has now traveled the distance between two consecutive sprocket holes and indication thereof may be made by updating a counter as will be described below.

In terms of a truth table with sensor 13 designated A and sensor 15 designated B the sequence of events for reverse film movement described above is as follows:

| A | B |
|---|---|
| 0 | 0 |
| 0 | 1 |
| 1 | 1 |
| 1 | 0 |
| 0 | 0 |

For forward movement of film from the position shown in FIG. 1, it can be seen that the truth table would be:

| A | B |
|---|---|
| 0 | 0 |
| 1 | 0 |
| 1 | 1 |
| 0 | 1 |
| 0 | 0 |

If a count, forward or backward, may be made to occur only when this sequence is followed in the proper order an infallible frame (or more correctly perforation hole) counter results. A logic circuit fulfilling this requirement will now be described with reference to FIG. 2.

The output signals from amplifiers 17 are provided on lines 31 and 33 as inputs to transistor inverters 35, shown in block form, which provide buffering between the amplifiers and the logic. This inversion will invert the truth tables above. To aid in explaining the logic diagram new truth tables for forward and reverse are shown on FIG. 2. Throughout the explanation input and output signals will be defined interms of logic "1"s and "0"s. For the logic shown, a "1" is a positive voltage and a "0" is ground potential. It will be recognized that with other types of logic which may equally well be used, other conventions are possible. It should also be noted that a transition from "0" to "1" is a positive-going pulse.

After each count the logic of FIG. 2 is all in a reset condition. Assuming the same example as above, with the film in the position shown in FIG. 1, sensors line up with the holes 24 and 25 both "A" and "B" would be "1"s. As the film moves in reverse, the first transition to occur is "B" going from a "1" to a "0" on line 39. This is inverted through inverter 41 causing "B̄" on line 43 to go from a "0" to "1." This sets latch 45 which has its Q output as one input to an And gate 47. Latch 45 and the remaining latches in the system may be Texas Instruments SN7474N.

In these devices a positive going pulse on the C input transfers the logic level on the D input to the Q output. Thus since "A" on line 49 is a "1" when "B̄" goes from "0" to "1" on line 43 the output of latch 45 also goes to one.

On succeeding transitions "A" goes from "1" to "0", "B" from "0" to "1" and finally "A" from "0" to "1" indicating a complete reverse cycle. On this last transition "B" will have been a "1" on line 39 and when "A" on line 49 goes to a "1" creating a positive pulse, the "1" on the D input of latch 51 is transferred to its Q output. This output is the second input to AND gate 47 which, now with has both inputs present causing its output go from "0" to "1", thus providing a down count pulse to a conventional up-down binary counter, 52 e.g., the counter may comrise a plurality of Texas Instrument Counters SN74193.

If the film is moved forwardly from the FIG. 1 position instead of in reverse, the first transition is "A" going from "1" to "0" and thus "Ā," on line 54 provided by inverter 53, going from "0" to "1" extant. With a "1" on the D input of latch 55 from B on line 39 the positive-going "Ā" pulse causes the Q output to go to "1." On the last forward transition "A" will have been "1" at the D input of latch 59. The positive-going pulse which results when "B" goes from "0" to "1" causes the Q output of latch 59 to go to "1."

The Q outputs of latches 55 and 59 are the two inputs to AND gate 57 causing its output go to "1" thus providing an up-count pulse to counter 52. At the end of either the forward or reverse cycle "1"s are present on both lines 39 and 49. These are provided as inputs to AND gate 61 causing its output to go to "1" triggering a oneshot 63 set to cause a delay sufficient for the count to be updated. One shot 63 then triggers a oneshot 65 which provides a clear command to latches 45, 51, 55 and 59 causing all the Q outputs to go to "0" readying the logic for another cycle. Pulse lengths are, i.e., a $\mu$ sec. or less that even if the film is moving at a high rate no transition will be missed.

The frame count function described so far can be performed by many well-known techniques, e.g., using a single light sensor for counting sprocket holes. However, the efficiency and accuracy of such systems is based on the assumption of smooth and regular film movement while, in actual practice, film for various reasons jitters or oscillates to some degree in most film transport systems.

In a conventional frame count system, if the film starts to move forwardly from the FIG. 1 position and all but the last transition is accomplished, a count would result since all the additional movement required is less than one-half a sprocket hole width. If the film now reverses to return to the starting position, a false count, or even two false counts would result because a conventional counting system would "AND" a direction command with a frame or sprocket hole count. During this period the commanded direction would remain the same, e.g., forward. As the film moved forwardly crossing a mark or sprocket hole a first pulse would result and when it went back a second. Thus the system would record two forward pulses.

However, in the system of the present invention no count occurs in such a situation. As the film moves backwards through the transition latch 51 will be set when "A" goes from "0" to "1" with B at "1" on the D input. But latches 45 and 59 will never have their conditions met and no count occurs either forward or reverse. In like manner, when moving in reverse, movement to the point of counting and a return will not cause a count.

Examination of the truth tables makes it clear that only if the required transitions occur in the proper order will the count conditions be satisfied. The first latch in each case, i.e., 45 and 55, indicates that a forward or reverse cycle has started. The second latch, i.e., 51 and 59 incidates the end of the cycle. Only if the direction of film movement in which the "A" – "1", "B" – "1" condition is left is the same direction as that condition is re-eneterd will a count occur. The reset logic associated with gate 61 assures a fresh start each time the "A" – "1", "B" – "1" condition is entered whether with or without a count.

Block 67 represents means to reset counter 52. This may be a simple reset switch to reset all the flip-flops in the counter or may be an automated reset command integrated into the film system. The frame count in binary form is taken off on a plurality of lines indicated by line 69 on the drawing. The first stage, i.e., $2^0$, of the counter will not be output with the second stage, i. e., $2^1$ being considered the $2^0$ output to accomplish a division by two. This is required since normally there are two sprockets per frame. If otherwise, a proper divide by N counter may be used when N is the number of sprocket hoels per frame.

The output of the counter may be decoded and displayed in base 10 form by conventional circuitry and/or displays and/or may be used in the film drive system if required, e.g., for comparison with a desired frame count to develop an error signal.

Thus a film frame counter which provides an accurate count irrespective of film jitter or oscillation has been shown. Although a specific embodiment has been shown and described various modifications may be made without departing from the spirit of the invention which is intended to be limited solely by the appended claims.

What is claimed is:

1. A film frame counter for use with a motion picture projector comprising:
   a. a first sensor to sense a sprocket hole by sensing an area less than one-half the length of a sprocket hole and arranged in a fixed position where it will intersect only the top half of a first sprocket hole when the film is in a predetermined position;
   b. a second similar sensor arranged to intersect only the bottom half of a second sprocket hole when said film is in said predetermined position, each of said sensors providing an output at a first level when intersecting a sprocket hole and at a second level when not sensing a sprocket hole;
   c. means responsive to the outputs of said first and second sensors to provide a forward count pulse only when all of the following sensor output signals occur in the listed order:

1. said first and second sensors provide simultaneous outputs at said first level;
2. said first sensor provides an output at said second level while the output of said second sensor remains at said first level;
3. said first and second sensors provide an output at said second level;
4. said first sensor provides an output at said first level while said second sensor remains at said second level; and
5. said first and second sensors provide an output at said first level;

and a reverse count pulse only when the following outputs occur in the listed order:
1. said first and second sensors provide simultaneous outputs at said first level;
2. said second sensor provides an output at said second level while the output of said first sensor remains at said first level;
3. said first and second sensors provide an output at said second level;
4. said second sensor provides an output at said first level while said first sensor remains at said second level; and
5. said first and second sensors provide an output at said first level; and d. a divide-by-N up-down counter having said count pulses as inputs, N being equal to the number of sprocket holes per frame of film.

2. The invention according to claim 1 wherein said responsive means comprise means to sense a transition of said first sensor from said first to said second level while said second sensor is at said first level and to sense the transition of said second sensor from said second to said first level while said first sensor is at said first level to indicate that the outputs have occurred in the proper order for a forward count and to sense the transition of said second sensor from said first to said second level while said first sensor remains at said first level and to sense the transition of said first sensor from said second to said first level while said second sensor is at said first level to indicate that the outputs have occurred in the proper order for a reverse count.

3. The invention according to claim 2 wherein said responsive means comprise:
   a. a first inverter having its input connected to the output of said first sensor;
   b. a second inverter having its input connected to the output of said second sensor;
   c. a first latch, having a data input and a load input operable such that a transition from said second level to said first level will cause the level on said data input to be provided at the output of said latch, with its data input connected to said first sensor and its load input to the output of said second inverter;
   d. a second similar latch having its data input connected to said second sensor and its load input to said first sensor;
   e. a first AND gate having the outputs of said first and second latches connected to its inputs and having its output connected to the down input of said counter;
   f. a third similar latch having its data input connected to said second sensor and its load input to said first inverter;
   g. a fourth similar latch having its data input connected to said first sensor and its load input to said second sensor;
   h. a second AND gate having the outputs of said third and fourth latches as its inputs and having its output connected to the up input of said counter;
   i. a third AND gate having as its two inputs the outputs of said first and second sensors; and
   j. delay means having as an input the output of said third AND gate and providing as an output, a predetermined time after an input appears, a short pulse said output being connected to a reset input on said first, second, third, and fourth latches to cause their outputs to go to said second level.

4. The invention according to claim 3 wherein said delay means comprise;
   a. a first one-shot multivibrator having its input connected to said third AND gate and providing an output a predetermined time after an input appears; and
   b. a second one-shot multivibrator having its input connected to the output of said first multivibrator to provide, on occurrence of an input, a pulse of predetermined length.

5. The invention according to claim 1 wherein said first and second sensors comprise:
   a. means to illuminate the sprocket hole area of said film on a first side;
   b. light absorbing means placed on the other side of said film; and
   c. light sensing means having an input field of view less than one-half sprocket hole length.

6. The invention according to claim 5 wherein said sensing means and illuminating means comprise a micro-character detector having a bundle of light transmitting fibers to provide illumination arranged around a light receiving fiber aligned with said sprocket holes and amplifying means to amplify the sensed signal and provide outputs at said first level when a low light level is received and at said second level when a high light level is received.

7. A method of counting film frames comprising:
   a. establishing a reference film frame position;
   b. aligning first and second sensing means which detect an area less than one half sprocket hole so that when the film is in said reference position said first means will be aligned with the top half of one sprocket hole and said second means with the bottom half of a second sprocket hole whereby if presence of a sprocket hole is designated a logic "1" and absence of a sprocket hole and logic "0" displacement of the film in one direction by the distance equal to the sprocket hole spacing causes the first and second sensing means to have outputs following a first order 1, 1;0,1;0,0;1,0; and 1,1 and in the other direction following a second order 1,1;1,0;0, 0;0, 1; and 1,1;
   c. sensing the order and occurrence of said logic states and providing, to an up-down counter, a count in one direction only when said first order occurs and in another direction only when said second order occurs; and
   d. dividing the count in said counter by the number of sprocket holes per frame of film.

8. The invention according to claim 7 wherein sensing said orders is accomplished by sensing only the first and last transitions in said first and second orders whereby a transition of said first sensor from 1 to 0 while the second remains at 1 and of said second sensor from 0 to 1 while said first sensor is 1 will result in a count in said one direction and a transition of said second sensor from 1 to 0 while said first sensor is 1 and of said first sensor from 0 to 1 while said second sensor is 1 will result in a count in said other direction.

* * * * *

UNITED STATES PATENT OFFICE
CERTIFICATE OF CORRECTION

Patent No. 3,793,508  Dated February 19, 1974

Inventor(s) Charles R. Maggi

It is certified that error appears in the above-identified patent and that said Letters Patent are hereby corrected as shown below:

Column 1, line 18, "thac" should be --that--.
Column 2, line 1, "sors" should be --sor--.
Column 3, line 47, after "are" insert --short enough--.
Column 4, line 31, "20" should be --2°--.

Signed and sealed this 2nd day of July 1974.

(SEAL)
Attest:

EDWARD M. FLETCHER, JR.
Attesting Officer

C. MARSHALL DANN
Commissioner of Patents